US009544873B2

United States Patent
Lie et al.

(10) Patent No.: US 9,544,873 B2
(45) Date of Patent: Jan. 10, 2017

(54) PAGING WITH QOS IN A WIRELESS COMMUNICATION SYSTEM

(75) Inventors: Gregory Robert Lie, San Diego, CA (US); Kevin Scott Seltmann, Oceanside, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1443 days.

(21) Appl. No.: 12/120,424

(22) Filed: May 14, 2008

(65) Prior Publication Data

US 2009/0286528 A1    Nov. 19, 2009

(51) Int. Cl.
*H04W 4/00*    (2009.01)
*H04W 68/00*   (2009.01)

(52) U.S. Cl.
CPC .................................. *H04W 68/00* (2013.01)

(58) Field of Classification Search
CPC .......... H04W 88/02; H04W 4/02; H04L 47/10
USPC ............... 455/422.1, 418, 412; 370/229, 338
See application file for complete search history.

(56) References Cited

U.S. PATENT DOCUMENTS

| | | | | |
|---|---|---|---|---|
| 6,285,601 | B1 * | 9/2001 | Smith ...................... | 365/189.05 |
| 7,120,113 | B1 * | 10/2006 | Zhang et al. ................. | 370/229 |
| 7,586,918 | B2 * | 9/2009 | Levy et al. ................. | 370/395.1 |
| 2003/0118044 | A1 * | 6/2003 | Blanc et al. .................. | 370/414 |
| 2005/0201311 | A1 * | 9/2005 | Willey et al. ................. | 370/311 |
| 2007/0171850 | A1 * | 7/2007 | Feder et al. .................. | 370/311 |
| 2007/0297375 | A1 * | 12/2007 | Bonta et al. .................. | 370/338 |
| 2008/0008203 | A1 * | 1/2008 | Frankkila et al. ............ | 370/412 |

* cited by examiner

*Primary Examiner* — Chuck Huynh
(74) *Attorney, Agent, or Firm* — Michael J. DeHaemer, Jr.; Howard H. Seo; Kevin T. Cheatham

(57) ABSTRACT

Techniques for sending page messages with quality of service (QoS) in a wireless communication system are described. In an aspect, a network entity receives incoming packets for access terminals operating in an idle state, generates page messages in response to the incoming packets, and includes QoS information in the page messages. The QoS information for each page message may indicate whether the page message is delay sensitive. A base transceiver station (BTS) receives page messages with QoS information and sends the page messages to access terminals based on the QoS information. In one design, the BTS determines whether each page message is delay sensitive based on the QoS information, sends page messages that are delay sensitive, and either sends or delays sending page messages that are delay insensitive in order to reduce the number of packets to send for the page messages.

21 Claims, 8 Drawing Sheets

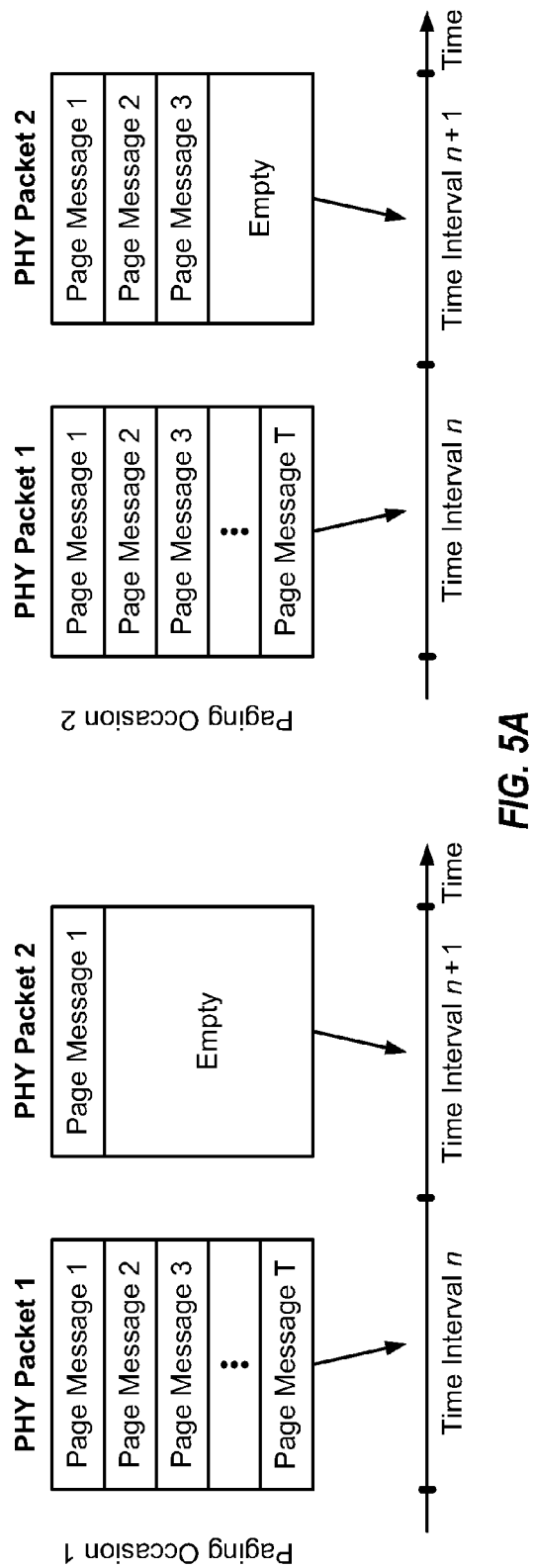
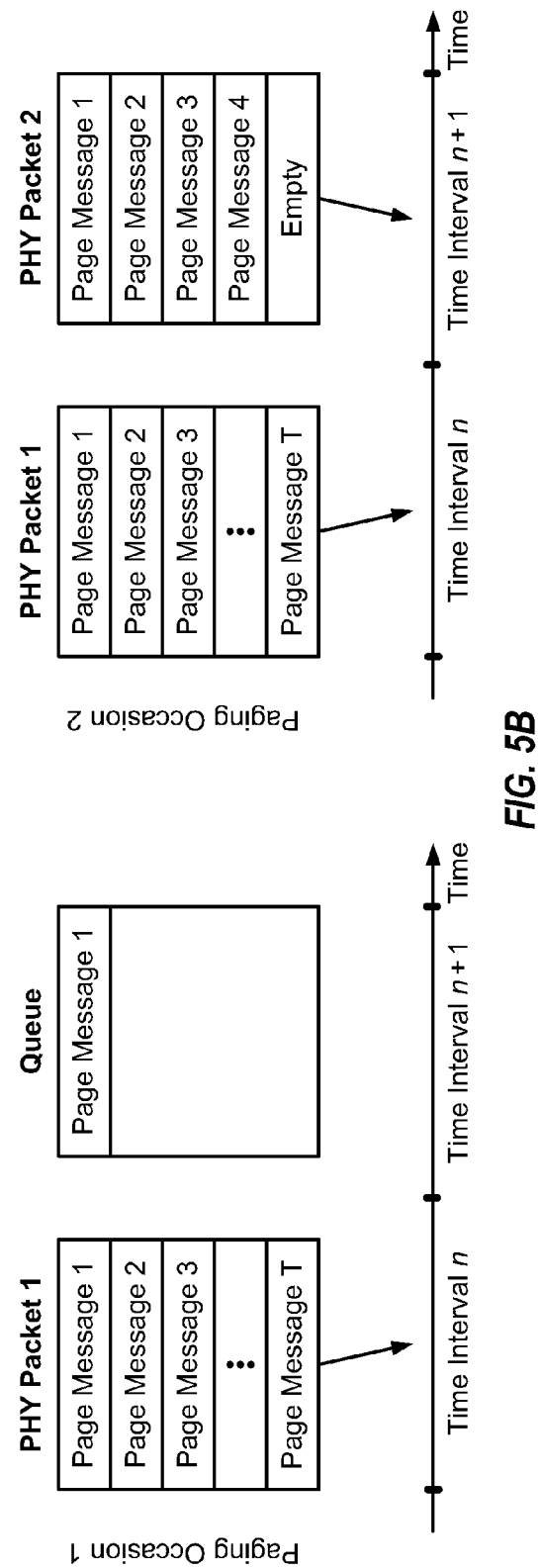
FIG. 5A
FIG. 5B

PAGING WITH QOS IN A WIRELESS COMMUNICATION SYSTEM

BACKGROUND

I. Field

The present disclosure relates generally to communication, and more specifically to techniques for sending page messages in a wireless communication system.

II. Background

An access terminal (e.g., a cellular phone) in a wireless communication system may operate in one of several states, such as "active" and "idle", at any given moment. In the active state, the access terminal may actively exchange data with one or more base transceiver stations (BTSs), e.g., for a voice and/or data call. In the idle state, the access terminal may monitor for messages applicable to the terminal. Such messages may include page messages that alert the access terminal to the presence of incoming call or overhead messages that carry system and other information for the terminal.

In the idle state, the access terminal continues to consume power to sustain circuitry used to receive messages. The access terminal may be portable and powered by an internal battery. Power consumption by the access terminal in the idle state decreases the available battery power, which then shortens the standby time between battery recharges and the talk time when a call is placed or received. Therefore, it is desirable to send page messages in a manner to reduce power consumption in the idle state and extend standby time for the access terminal.

SUMMARY

Techniques for sending page messages with quality of service (QoS) in a wireless communication system are described herein. In an aspect, a network entity receives incoming packets for access terminals operating in the idle state, generates page messages in response to the incoming packets, and includes QoS information in the page messages. The QoS information may be used by BTSs to more efficiently send the page messages to the access terminals and/or by the access terminals to vary their random access behavior. In one design, the QoS information for each page message includes a bit indicating whether the page message is delay sensitive or delay insensitive. The QoS information for each page message may be determined based on a port number, a traffic connection, or an application for a corresponding incoming packet or based on QoS negotiated with a recipient access terminal of the page message.

In another aspect, a BTS receives page messages comprising QoS information from the network entity and sends the page messages to access terminals based on the QoS information. In one design, the BTS determines whether each page message is delay sensitive or delay insensitive based on the QoS information, e.g., the delay sensitive bit. The BTS sends page messages that are delay sensitive and either sends or delays sending page messages that are delay insensitive in order to reduce the number of packets to send for the page messages. In one design, the BTS generates at least one packet with the page messages that are delay sensitive and fills the at least one packet with the page messages that are delay insensitive. The BTS generates each additional packet with remaining page messages that are delay insensitive if at least a particular percentage of the packet can be filled. Otherwise, the BTS delays sending the remaining page messages.

In yet another aspect, an access terminal receives a page message comprising QoS information and performs random access based on the QoS information. The access terminal may send at least one access probe for the random access and may determine the transmit power for each access probe and/or the wait time between access probes based on the QoS information.

Various aspects and features of the disclosure are described in further detail below.

BRIEF DESCRIPTION OF THE DRAWINGS

FIG. 5A shows example transmission of page messages without QoS.

FIG. 5B shows example transmission of page messages with QoS.

DETAILED DESCRIPTION

The techniques described herein may be used for various wireless communication systems such as Code Division Multiple Access (CDMA) systems, Time Division Multiple Access (TDMA) systems, Frequency Division Multiple Access (FDMA) systems, Orthogonal FDMA (OFDMA) systems, Single-Carrier FDMA (SC-FDMA) systems, etc. The terms "system" and "network" are often used interchangeably. A CDMA system may implement a radio technology such as cdma2000, Universal Terrestrial Radio Access (UTRA), etc. cdma2000 covers IS-2000, IS-95, and IS-856 standards. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). Long Term Evolution (LTE) is an upcoming release of UMTS that uses E-UTRA. UTRA, E-UTRA, UMTS, LTE and GSM are described in documents from an organization named "3rd Generation Partnership Project" (3GPP). cdma2000 and UMB are described in documents from an organization named "3rd Generation Partnership Project 2" (3GPP2).

For clarity, certain aspects of the techniques are described below for a High Rate Packet Data (HRPD) system that implements IS-856. HRPD is also referred to as CDMA2000 1xEV-DO (Evolution-Data Optimized), 1xEV-DO, 1x-DO, DO, High Data Rate (HDR), etc. HRPD is described in 3GPP2 C.S0024-B, entitled "cdma2000 High Rate Packet Data Air Interface Specification," dated March 2007, which is publicly available.

Figure 1:
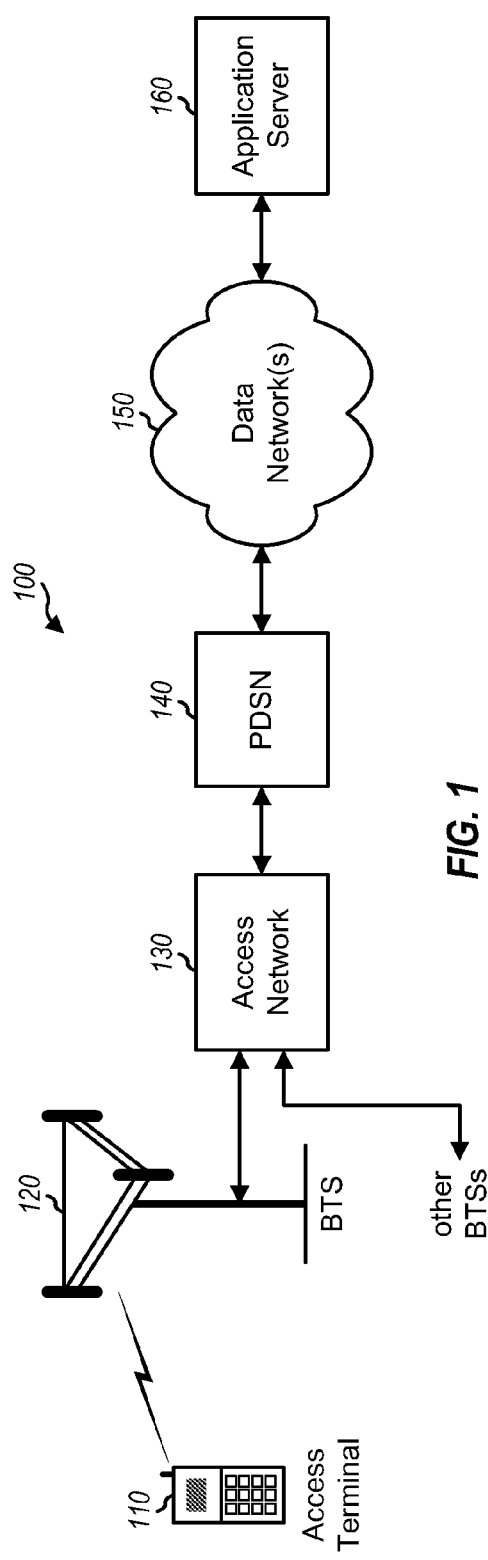
FIG. 1 shows a wireless communication system.

FIG. 1 shows a wireless communication system 100, which may be an HRPD system. Wireless system 100 includes a number of BTSs that support radio communication for a number of access terminals (ATs). For simplicity, only one BTS 120 is shown in FIG. 1. A BTS is generally a fixed station that communicates with the access terminals and may also be referred to as a base station, an access point, a Node B, an evolved Node B, etc. An access network (AN) 130 may include various network entities such as Base Station Controllers (BSCs) and Packet Control Functions (PCFs) that provide coordination and control for the BTSs and route data for these BTSs. Access network 130 also generates page messages for the access terminals and forwards the page messages to the BTSs for transmission to the access terminals. A Packet Data Serving Node (PDSN) 140 supports data services for access terminals. PDSN 140 may be responsible for establishment, maintenance, and termination of data sessions for the access terminals and may further assign dynamic Internet Protocol (IP) addresses to the access terminals. PDSN 140 may couple to data network(s) 150, which may comprise a core network, private and/or public data networks, the Internet, etc. Wireless system 100 may include other network entities not shown in FIG. 1.

An application server 160 may communicate with access terminals via wireless system 100. Application server 160 may support applications such as Voice-over-IP (VoIP), data download, email, etc. Although not shown in FIG. 1 for simplicity, other servers may also exchange data with access terminals via PDSN 140 and/or access network 130.

Access terminals may be distributed throughout the system, and each access terminal may be stationary or mobile. For simplicity, only one access terminal 110 is shown in FIG. 1. Access terminal 110 may also be referred to as a mobile station, a user equipment, a user terminal, a subscriber unit, a station, etc. Access terminal 110 may be a cellular phone, a personal digital assistant (PDA), a wireless modem, a handheld device, a laptop computer, etc. Access terminal 110 may communicate with BTS 120 via the forward and reverse links. The forward link (or downlink) refers to the communication link from the BTS to the access terminal, and the reverse link (or uplink) refers to the communication link from the access terminal to the BTS.

Figure 2:
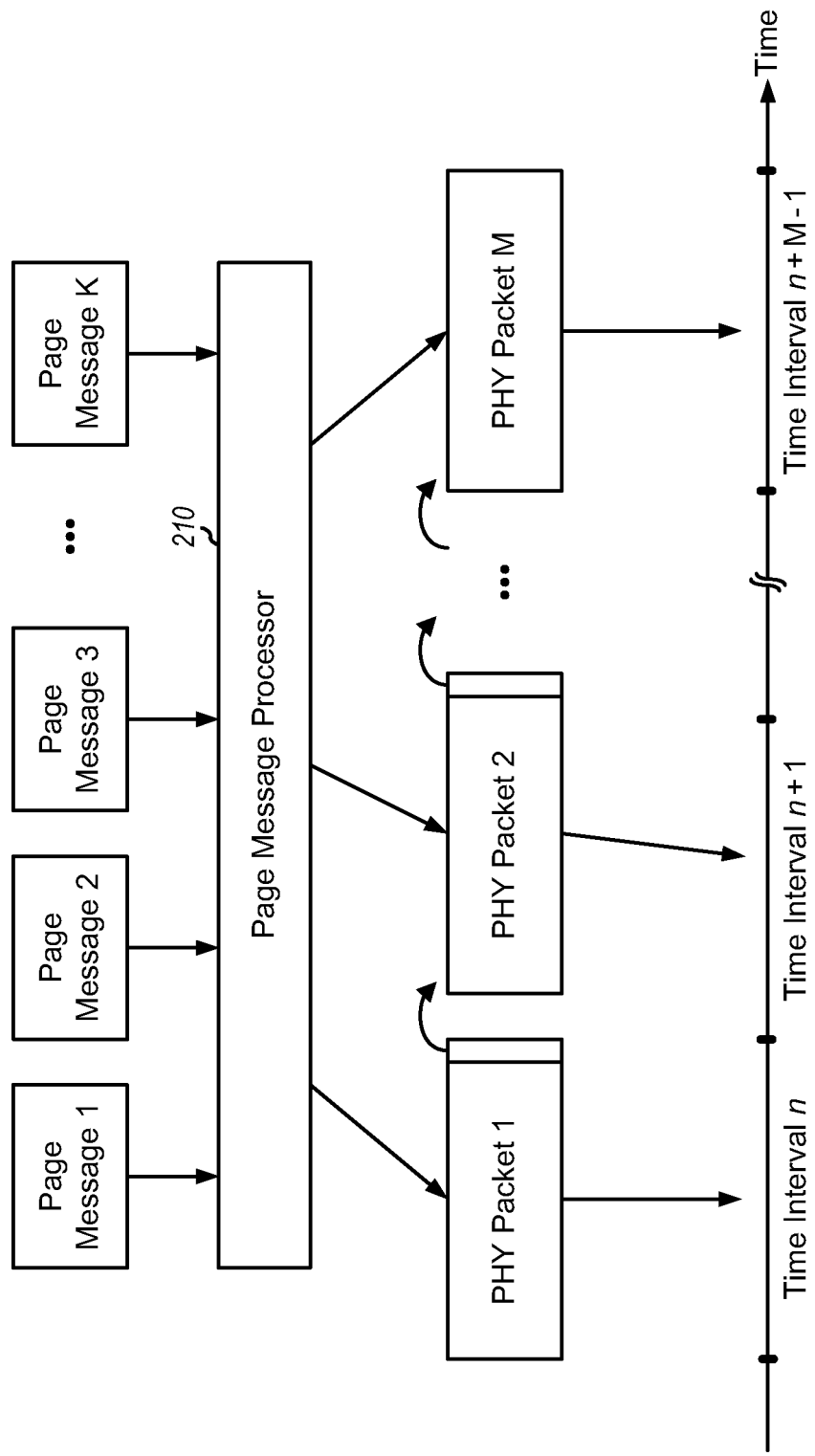
FIG. 2 shows processing and transmission of page messages without QoS.

FIG. 2 shows processing and transmission of page messages by BTS 120 in FIG. 1. BTS 120 may receive K page messages to send in a page occasion, where K may be any integer value one or greater. A page message may also be referred to as a page, a paging message, etc. Each page message may have a fixed size (in HRPD) or a variable size. The K page messages and possibly other information may be encapsulated in a synchronous Control Channel capsule at a Medium Access Control (MAC) layer.

A page message processor 210 may process the synchronous Control Channel capsule and generate M physical layer (PHY) packets, where M may be any integer value one or greater. The number of PHY packets to generate may be dependent on various factors such as the size of the synchronous Control Channel capsule and the size of each PHY packet. The size of the synchronous Control Channel capsule may, in turn, be dependent on the number of page messages to send, the size of each page message, the amount of other information to send, etc. The other information may be sent in the first PHY packet, and each remaining PHY packet may include only or mostly page messages. Each PHY packet may include a bit that indicates whether or not another PHY packet will follow for the synchronous Control Channel capsule. In general, the page messages may be sent in any number of packets of any type and in any layer. For clarity, the description below assumes that page messages are sent in PHY packets.

BTS 120 may send each PHY packet in a time interval that may be fixed or variable. For HRPD, a PHY packet may be sent in a time interval ranging from a minimum of one slot to a maximum of 16 slots, with consecutive slots being spaced apart by four slots. A slot has a duration of 1.667 milliseconds (ms). Thus, a time interval may range from 1.667 ms to 106.67 ms in HRPD. BTS 120 may send the M PHY packets in M time intervals.

While in an idle state, access terminal 110 may be assigned specific paging occasions during which it might receive page messages from access network 130. The time duration between consecutive paging occasions is referred to as a page period and is configurable for access terminal 110. Access terminal 110 may wake up prior to each paging occasion and receive all PHY packets for a synchronous Control Channel capsule for that paging occasion. Access terminal 110 may determine whether or not a page message has been sent for the terminal, perform appropriate actions if a page message has been sent for the terminal, or go back to sleep otherwise.

Access terminal 110 may remain awake to receive all PHY packets during each paging occasion. The number of PHY packets to receive may be dependent on the number of page messages being sent by BTS 120 and may change from paging occasion to paging occasion. The number of PHY packets may impact standby time of access terminal 110. The standby time may be of significant importance for access terminal 110 and especially for applications such as Push-To-Talk and always-on email. For example, access terminal 110 may stay awake for only one time interval to receive one PHY packet and may stay awake two times longer to receive two PHY packets. If two PHY packets are sent Q percent (e.g., 70%) of the time, then the awake duration increases by a factor of two for Q percent, and the standby time decreases by Q percent over a case in which only one PHY packet is sent in each paging occasion.

In an aspect, page messages may be sent in a manner to reduce the number of PHY packets while minimally impacting performance. Page messages may be sent for various purposes such as to alert access terminals to incoming calls or data, to update the status of applications running on the access terminals, etc. Some page messages may be time critical while many page messages may not be sensitive to delay. For example, page messages may be sent for push-based email applications to keep the emails of access terminals up to date, and these page messages are typically not time critical. The number of PHY packets may be reduced by sending page messages with QoS, which may entail (i) sending page messages that are time critical as soon as they are received and (ii) bundling and sending page messages that are not time critical in a more efficient manner.

Figure 3:
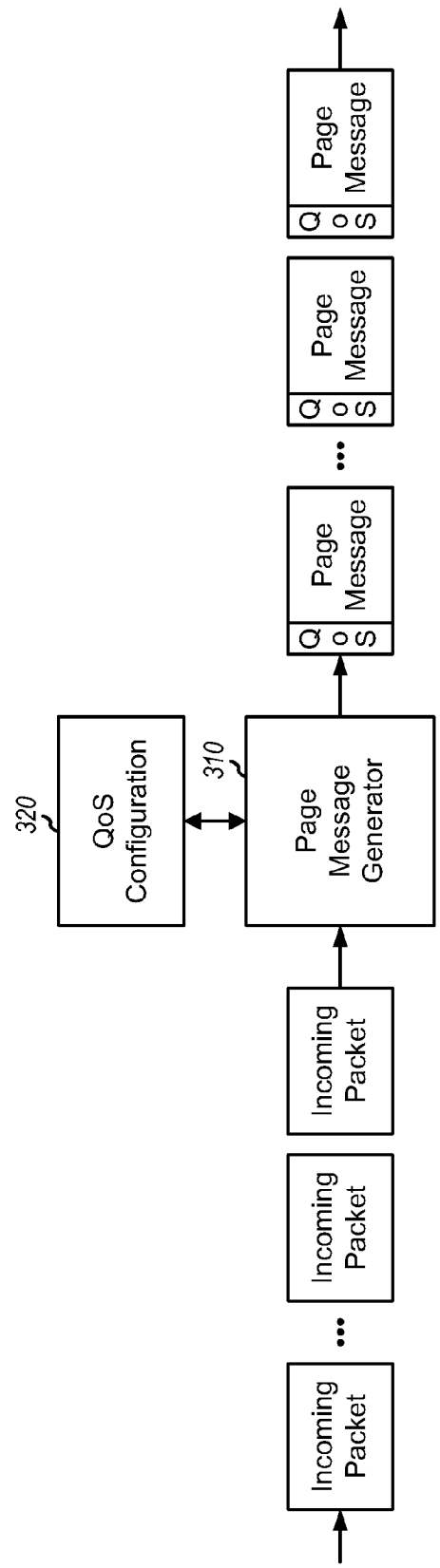
FIG. 3 shows generation of page messages with QoS.

FIG. 3 shows a design of generation of page messages with QoS by access network 130. At access network 130, a page message generator 310 may receive incoming packets from PDSN 140 and/or other network entities for access terminals operating in the idle state. In the description herein, the term "incoming packets" covers any data, messages, and information to send to access terminals. Generator 310 may generate page messages for these access terminals and may then forward the page messages to appropriate BTSs for transmission to the access terminals.

Generator 310 may determine QoS information for page messages based on the incoming packets and/or QoS configuration information stored in a memory 320.

To support paging with QoS, access network 130 may determine QoS of incoming packets that trigger generation of the page messages. Access network 130 may include QoS information in each page message (or in only certain page messages). In general, the QoS information may comprise any information that may be useful in handling a page message and/or in responding to the page message. In one design, the QoS information comprises a delay sensitive bit that may be set to '1' if a page message is delay sensitive or to '0' if the page message is delay insensitive. In another design, the QoS information indicates the maximum allowable delay for a page message. In yet another design, the QoS information indicates a page type of a page message being sent. A recipient access terminal may behave differently for different page types, as described below. The QoS information may also convey other information. For clarity, much of the description below is for the design in which the QoS information comprises a delay sensitive bit.

Access network 130 may determine QoS information for a page message based on QoS of an incoming packet that triggers generation of that page message. In one design, access network 130 determines the QoS of the incoming packet based on information contained in the packet. An application running on access terminal 110 may be bounded to a port number so that transport layer protocols such as Transmission Control Protocol (TCP) can identify the application for packets exchanged for the application. The application may be associated with certain QoS requirements, which may be made known to access network 130. Access network 130 may determine the port number for the incoming packet, determine the application for the packet based on the port number and the recipient access terminal, determine the QoS of the application, generate a page message in response to the packet, and generate QoS information for the page message based on the QoS of the application. Access network 130 may also determine the QoS of the incoming packet based on a destination address for the packet, a flow label or a traffic class in an IP header for the packet, the packet content, and/or other information in the packet. Access network 130 may also determine the QoS of the incoming packet based on a traffic connection for the packet.

In another design, access network 130 and access terminal 110 may negotiate QoS for page messages. Access terminal 110 may exchange data for one or more applications via one or more flows. A flow may also be referred to as a Radio Link Protocol (RLP) instance in HRPD. Access network 130 and access terminal 110 may negotiate QoS for each flow and may thereafter exchange data for each flow in accordance with the negotiated QoS for that flow. Access network 130 and access terminal 110 may negotiate QoS for page messages using the same mechanism used for negotiating QoS for flows. The negotiated QoS for page messages may indicate the QoS to be applied to different types of page messages. Access network 130 may thereafter mark page messages of each type based on the negotiated QoS for that type. In all designs, pertinent information used to determine QoS information for page message may be stored in memory 320 in FIG. 3.

Figure 4:
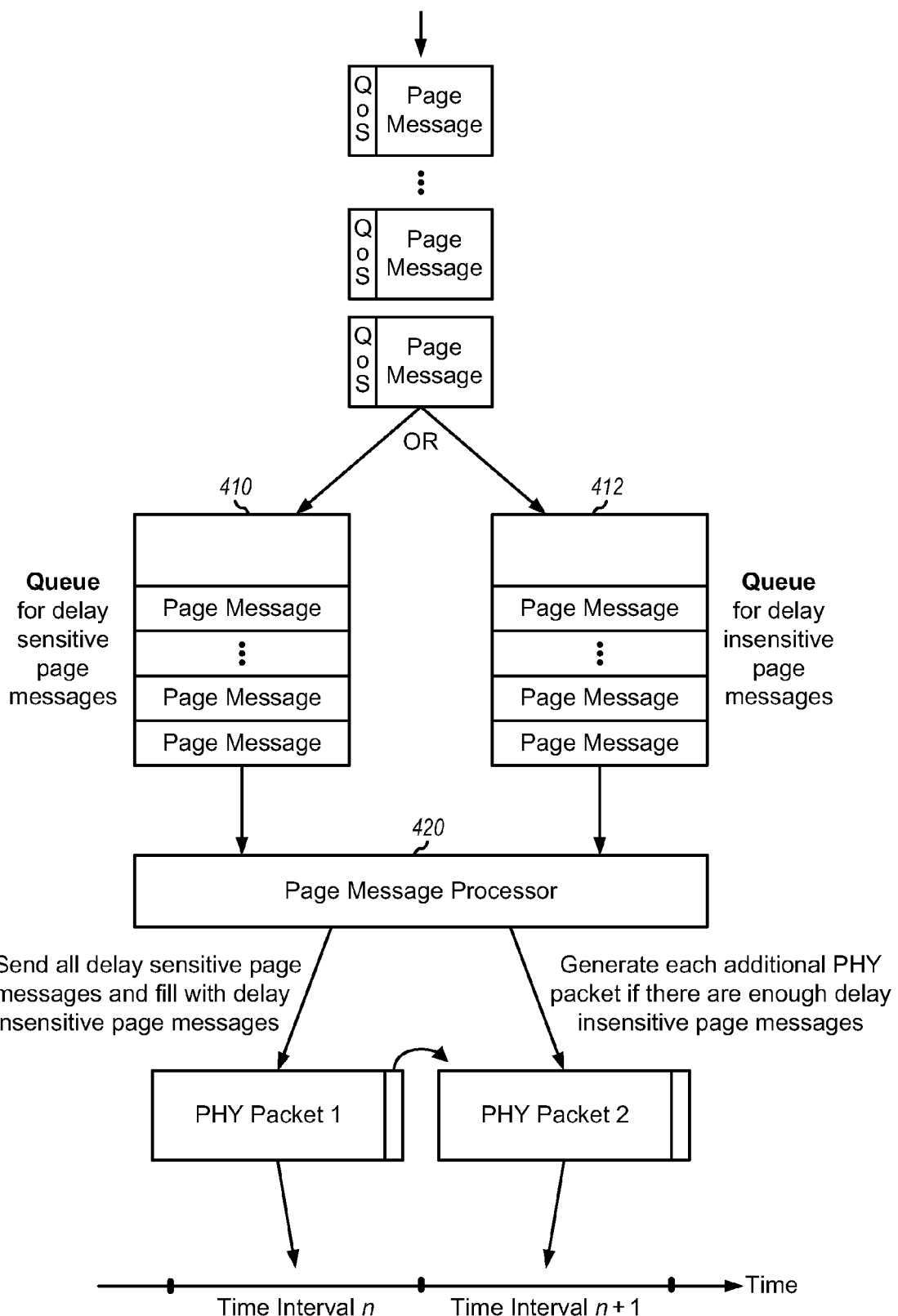
FIG. 4 shows processing and transmission of page messages with QoS.

FIG. 4 shows a design of processing and transmission of page messages with QoS by BTS 120. BTS 120 may receive page messages from access network 130, with each page message including QoS information. In one design, BTS 120 may maintain a queue 410 for delay sensitive page messages and a queue 412 for delay insensitive page messages. BTS 120 may place each incoming page message in either queue 410 or 412 based on the QoS information (e.g., the delay sensitive bit) for that page message.

BTS 120 may then generate one or more PHY packets for the page messages. In one design, a page message processor 420 sends all delay sensitive page messages from queue 410 and may send zero or more delay insensitive page messages from queue 412. Processor 420 may pack the first PHY packet with the page messages from queue 410 and may then fill this PHY packet with page messages from queue 412 if there is still room in the PHY packet. Processor 420 may also generate a second PHY packet if either (i) all delay sensitive page messages cannot fit in the first PHY packet or (ii) there are enough page messages to sufficiently fill the second PHY packet. Processor 420 may generate each additional PHY packet in similar manner.

In general, BTS 120 may generate a sufficient number of PHY packets in order to send all delay sensitive page messages and to send the delay insensitive page messages as efficiently as possible. In one design, BTS 120 may generate a PHY packet with only delay insensitive page messages if X percent or more of the PHY packet is filled. This X percent may be 50%, 75%, 90%, 100% or some other percentage. A higher percentage may reduce the number of PHY packets to send on average and improve standby time of the access terminals at the expense of longer delay for some page messages.

BTS 120 may send each PHY packet in a time interval. The number of PHY packets to send may be reduced by not sending "sparse" PHY packets. A sparse PHY packet is a PHY packet containing only delay insensitive page messages and having less than X percent of the PHY packet filled.

FIG. 5A shows example transmission of page messages without QoS. In this example, BTS 120 receives enough page messages in paging occasion 1 to completely fill PHY packet 1 and partially fill PHY packet 2. BTS 120 generates one full PHY packet and one sparse PHY packet and sends the two PHY packets in two time intervals. In the next paging occasion 2, BTS 120 similarly receives enough page messages to completely fill PHY packet 1 and partially fill PHY packet 2. BTS 120 again generates one full PHY packet and one sparse PHY packet and sends the two PHY packets in two time intervals. Access terminal 110 is awake for two time intervals in each paging occasion to receive the two PHY packets sent in that paging occasion.

FIG. 5B shows example transmission of page messages with QoS. In this example, BTS 120 receives enough page messages in paging occasion 1 to completely fill PHY packet 1 and partially fill PHY packet 2. BTS 120 generates one PHY packet containing delay sensitive and/or delay insensitive page messages. BTS 120 places the remaining delay insensitive page messages in queue 412 since these page messages are insufficient to generate another PHY packet with at least X percent occupancy. BTS 120 sends one PHY packet in one time interval. Access terminal 110 is awake for one time interval to receive one PHY packet sent in paging occasion 1.

In the next paging occasion 2, BTS 120 similarly receives enough page messages to completely fill PHY packet 1 and partially fill PHY packet 2. The received page messages occupy less than X percent of PHY packet 2. However, the combination of the received page messages and the stored page messages from queue 412 occupy more than X percent of PHY packet 2. BTS 120 thus generates and sends two PHY packets in two time intervals. Access terminal 110 is awake for two time intervals to receive the two PHY packets sent in paging occasion 2.

In the examples shown in FIGS. 5A and 5B, the page messages for two paging occasions may be sent in three PHY packets with QoS and in four PHY packets without QoS. In general, the amount of reduction in the number of PHY packets may be dependent on various factors such as the number of page messages received in each paging occasion, the PHY packet size, the X percent, etc.

Transmission of delay insensitive page messages may be delayed in several manners. In one design, BTS 120 may queue the incoming delay insensitive page messages and may send them in a first in first out (FIFO) manner. A given delay insensitive page message may be delayed by zero, one or multiple paging occasions, depending on the various factors discussed above. In another design, BTS 120 may limit the amount of delay experienced by each delay insensitive page message. For example, BTS 120 may move each page message that has been delayed by Y paging occasions from queue 412 to queue 410, where Y is the maximum delay for page messages.

In general, in each paging occasion, BTS 120 may first determine all pending page messages to be sent, which may include page messages received in the current paging occasion as well as queued page messages. BTS 120 may segregate the pending page messages into multiple groups based on the QoS information for these page messages. BTS 120 may form two groups for delay sensitive and delay insensitive page messages, as described above, or may form more than two groups. BTS 120 may then generate as many PHY packets as needed such that (i) all page messages that need to be sent in the current paging occasion (e.g., delay sensitive page messages) are mapped to PHY packets and (ii) there are no sparse PHY packets containing page messages that can be delayed. BTS 120 may then transmit each generated PHY packet.

In another aspect, the BTSs send page messages with QoS information. In one design, the QoS information may convey the reason for a page message, e.g., whether the page message is for an incoming call, an incoming packet that is not delay sensitive, etc. In another design, the QoS information may convey the type of data that triggers the page message, e.g., whether the page message is for a VoIP packet, a delay insensitive packet, etc. The QoS information may also convey other types of information.

Access terminal 110 may perform random access in response to receiving a page message and may alter its random access behavior based on the QoS information in the page message. For random access, access terminal 110 may transmit a first access probe on the reverse link and then listen for an access response. If an access response is not received, then access terminal 110 may select a random wait time within a backoff window, wait until the random wait time has elapsed, and then transmit a second access probe at higher power. Access terminal 110 may repeat increasing the backoff window, waiting a random wait time within the backoff window, and transmitting another access probe at higher power until an access response is received. Access terminal 110 may determine whether the received page message is for a time critical application based on the QoS information in the page message. If the application is time critical, then access terminal 110 may ramp the transmit power faster, select a smaller backoff window, and/or adjust other access parameters in order to gain access more quickly. For example, access terminal 110 may use the QoS information in the page message to control timing of access probes. In HRPD, access probes are sent in time selected randomly based on a persistence test. HRPD provides a persistence value (APersistence) that may be changed in order to increase the likelihood of sending access probes earlier. Certain classes of access terminals may have APersistence values that increase the likelihood of sending access probes early. Access terminal 110 may dynamically change the APersistence value based on the QoS information in the page message in order to change the timing of sending access probes. Access terminal 110 may also send certain information in access probes for certain applications in order to expedite setup.

Figure 6:
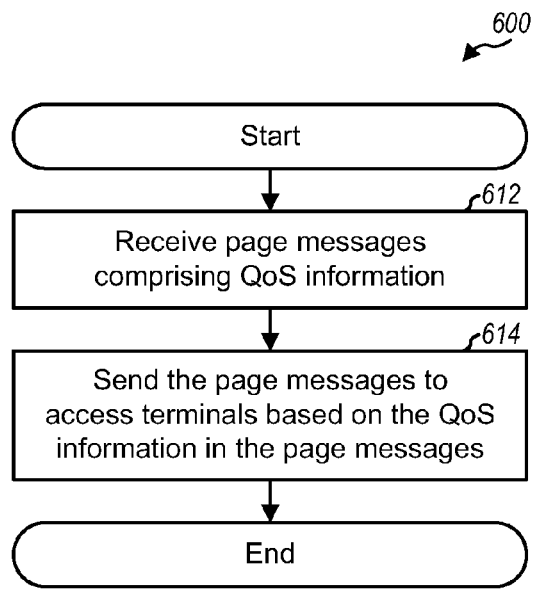
FIG. 6 shows a process for sending page messages with QoS.

FIG. 6 shows a design of a process 600 for sending page messages with QoS in a wireless communication system. Process 600 may be performed by BTS 120 or some other entity. Page messages comprising QoS information may be received from an access network (block 612). The page messages may be sent to access terminals based on the QoS information in the page messages (block 614). In one design, the QoS information may be removed, and the page messages without QoS information may be sent to the access terminals. In another design, the page messages with at least part of the QoS information may be sent to the access terminals.

Figure 7:
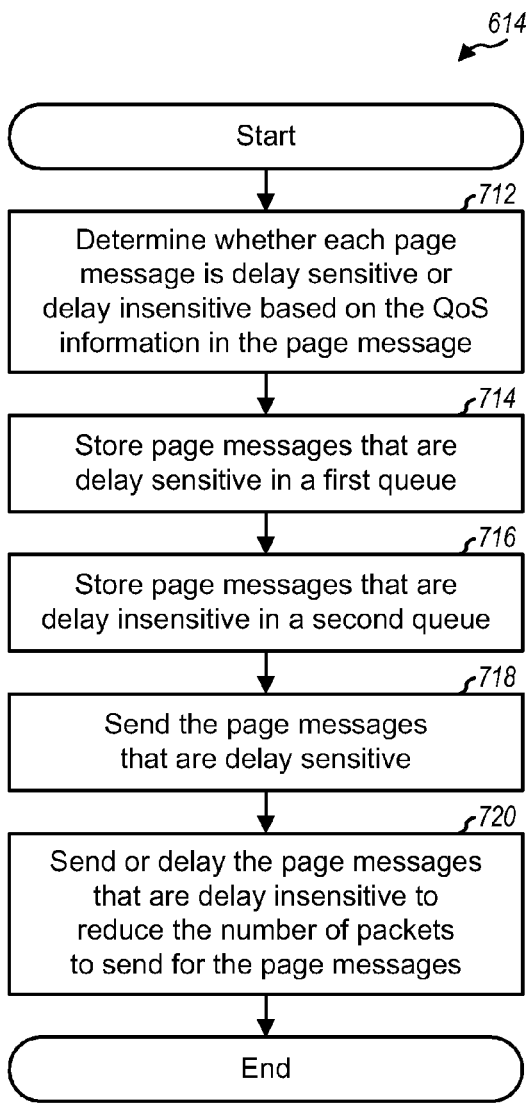
FIG. 7 shows a process for sending or delaying page messages.

FIG. 7 shows a design of block 614 in FIG. 6. In this design, whether each page message is delay sensitive or delay insensitive may be determined based on the QoS information (e.g., a delay sensitive bit) in the page message (block 712). Page messages that are delay sensitive may be stored in a first queue (block 714), and page messages that are delay insensitive may be stored in a second queue (block 716). The page messages that are delay sensitive may be sent (block 718). The page messages that are delay insensitive may be sent or delayed in order to reduce the number of packets to send for the page messages (block 720).

Figure 8:
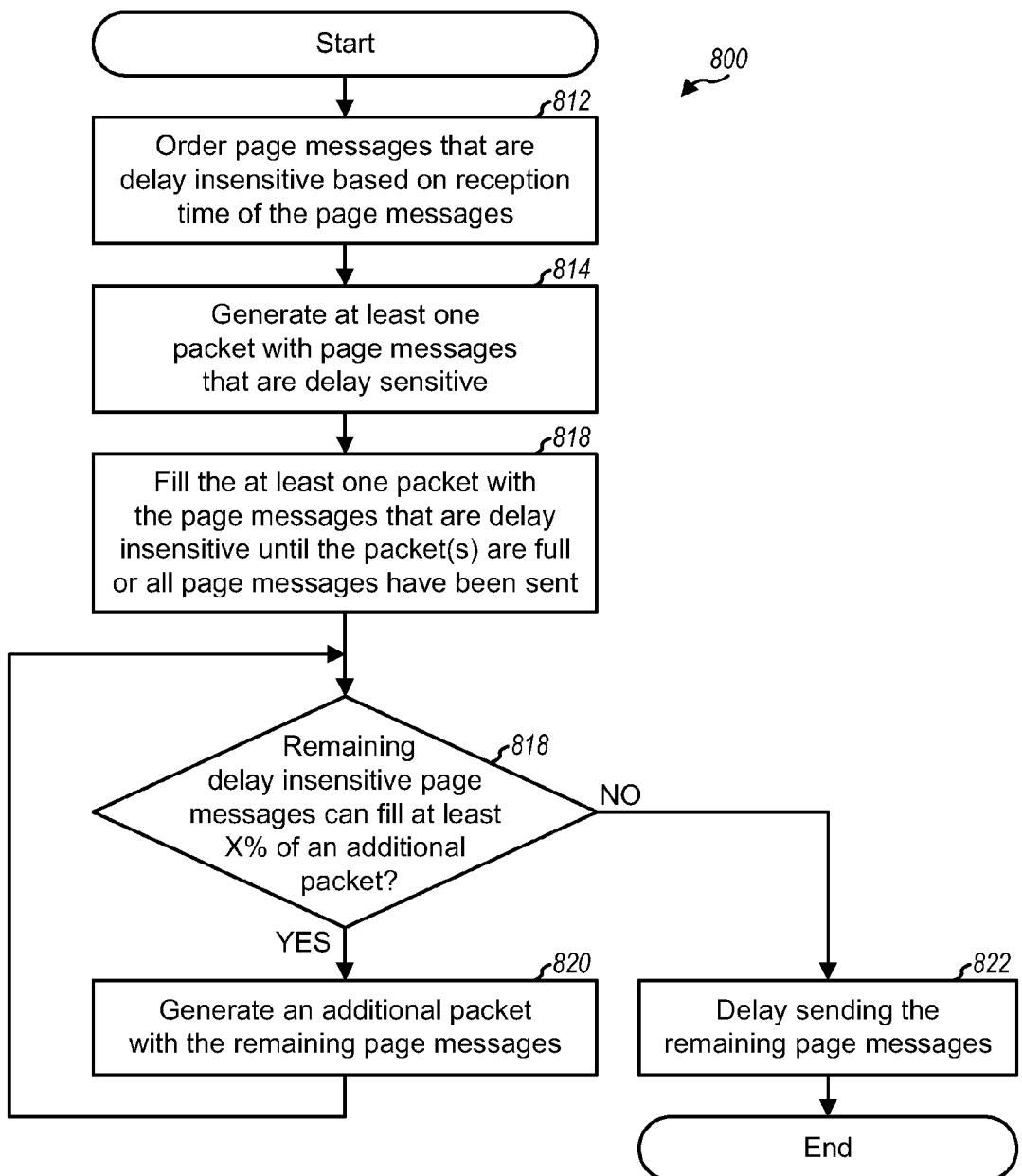
FIG. 8 shows a process for generating packets for page messages.

FIG. 8 shows a design of a process 800 for generating packets for page messages. Process 800 may be used for block 614 in FIG. 6 and also for blocks 718 and 720 in FIG. 7. In this design, the page messages that are delay insensitive (which include page messages received in the current and prior paging occasions) may be ordered based on reception time of the page messages, with an earliest/oldest received page message being first and a latest/newest received page message being last (block 812). In another design, the QoS information for each page message indicates one of a plurality of QoS levels or priority levels. The page messages may then be ordered based on their QoS levels. If a page message is delayed by a particular amount of time, then the QoS level of the page message may be increased, and the page message may be sent more quickly.

At least one packet may be generated with the page messages that are delay sensitive (block 814). The at least one packet may be filled with the page messages that are delay insensitive until the at least one packet is full or all page messages have been sent (block 816). A determination is made whether remaining page messages that are delay insensitive, if any, can fill at least a particular percentage of an additional packet (block 818). The particular percentage may be at least 50 percent or some other value. The particular percentage may also be based on (e.g., proportional to) an estimate of the loads of a control channel carrying the page messages. If the answer is 'Yes' for block 818, then an additional packet may be generated with the remaining page messages (block 820), and the process then returns to block 818 to determine whether to generate another packet. Otherwise, if the answer is 'No' for block 818, then transmission of the remaining page messages may be delayed (block 822). The at least one packet and the additional packet(s) may be filled with the delay insensitive page messages based on the order determined in block 812.

Figure 9:
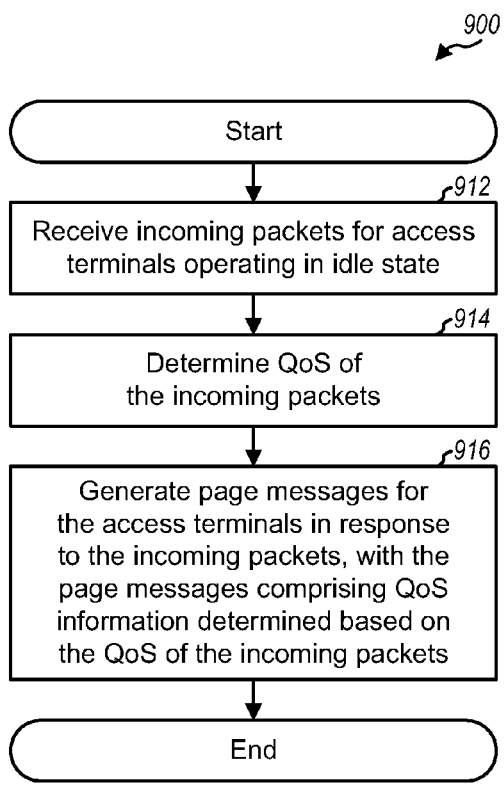
FIG. 9 shows a process for generating page messages with QoS.

FIG. 9 shows a design of a process 900 for generating page messages with QoS in a wireless communication system. Process 900 may be performed by access network 130, for example, by a BSC/PCF or some other network entity. In this design, incoming packets for access terminals operating in the idle state may be received (block 912). QoS of the incoming packets may be determined (block 914). Page messages for the access terminals may be generated in response to the incoming packets, with the page messages comprising QoS information determined based on the QoS of the incoming packets (block 916). In one design, the QoS information for each page message may comprise a bit indicating whether the page message is delay sensitive or delay insensitive. In another design, the QoS information for each page message may comprise at least one bit indicating delay requirements of the page message, which may be quantized with any number of levels. The QoS information may also comprise other information.

The QoS of the incoming packets may be determined based on information in the packet, a port number, a traffic connection, or an application for the incoming packet, etc. The access network may also negotiate with an access terminal for QoS of page messages for the access terminal. The access network may thereafter determine QoS information for page messages for the access terminal based on the negotiated QoS.

Figure 10:
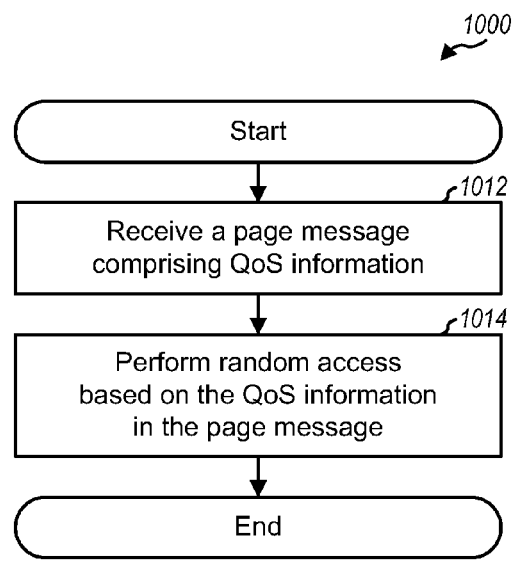
FIG. 10 shows a process for receiving page messages with QoS.

FIG. 10 shows a design of a process 1000 for receiving page messages in a wireless communication system. Process 1000 may be performed by access terminal 110 or some other network entity. In this design, a page message comprising QoS information may be received (block 1012). Random access may be performed based on the QoS information in the page message (block 1014). For block 1014, at least one access probe may be sent for the random access. The transmit power for each access probe and/or the wait time between access probes may be determined based on the QoS information. Other aspects of random access may also be dependent on the QoS information in the page message.

Figure 11:
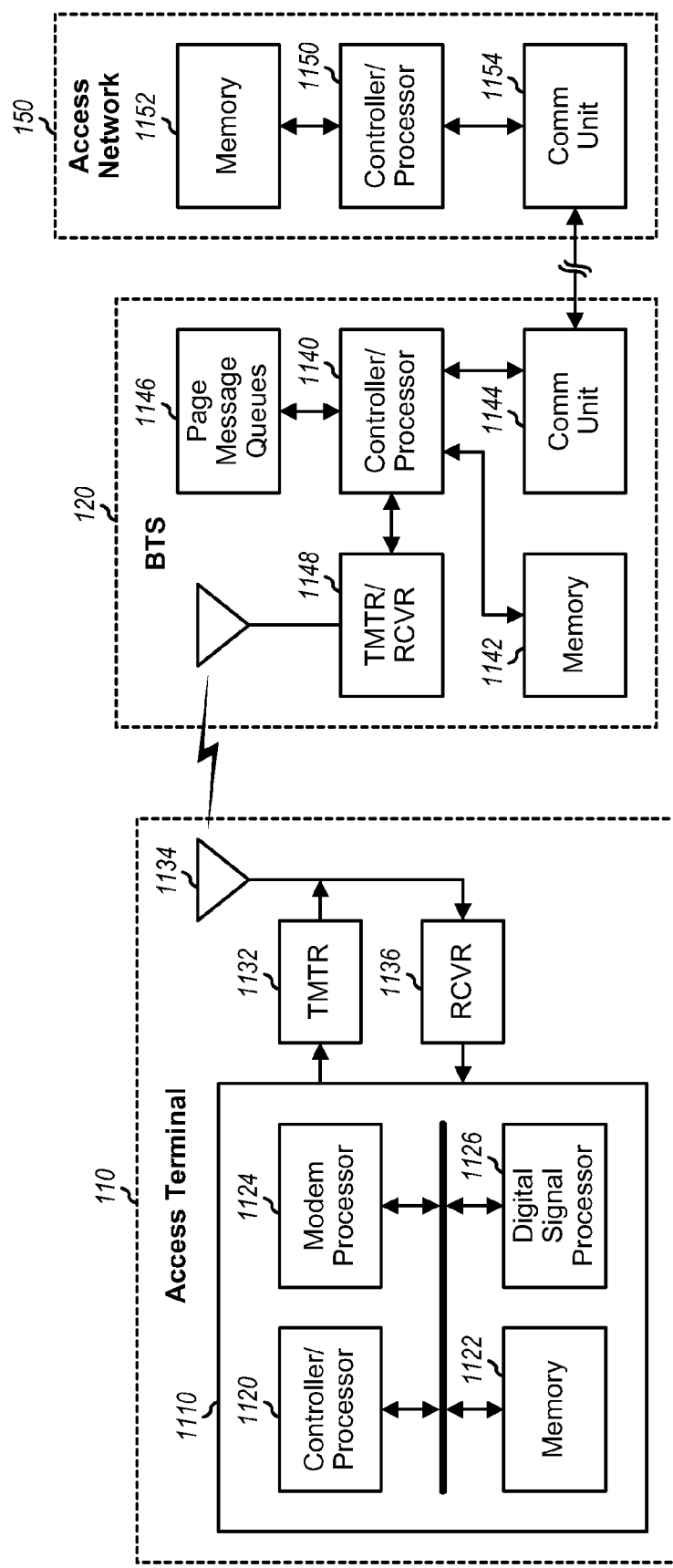
FIG. 11 shows a block diagram of an access terminal, a BTS, and an access network.

FIG. 11 shows a block diagram of a design of access terminal 110, BTS 120, and access network 130 in FIG. 1. At access terminal 110, a modem processor 1124 may receive data to be sent by the access terminal, process (e.g., encode and modulate) the data, and generate output chips. A transmitter (TMTR) 1132 may condition (e.g., convert to analog, filter, amplify, and frequency upconvert) the output chips and generate a reverse link signal, which may be transmitted via an antenna 1134. On the forward link, antenna 1134 may receive forward link signals from BTS 120 and/or other BTSs. A receiver (RCVR) 1136 may condition (e.g., filter, amplify, frequency downconvert, and digitize) the received signal from antenna 1134 and provide samples. Modem processor 1124 may process (e.g., demodulate and decode) the samples and provide decoded data. Modem processor 1124 may perform processing in accordance with a radio technology (e.g., HRPD, CDMA 1x, WCDMA, GSM, etc.) utilized by the system. A digital signal processor 1126 may perform various types of processing for access terminal 110.

A controller/processor 1120 may direct the operation at access terminal 110. Controller/processor 1120 may perform or direct process 1000 in FIG. 10 and/or other processes for the techniques described herein. A memory 1122 may store program codes and data for access terminal 110. Processors 1120, 1124 and 1126 and memory 1122 may be implemented on an application specific integrated circuit (ASIC) 1110.

At BTS 120, transmitter/receiver (TMTR/RCVR) 1148 may support radio communication with access terminal 120 and/or other access terminals. A controller/processor 1140 may perform various functions for communication with the access terminals. Controller/processor 1140 may perform or direct process 600 in FIG. 6, process 614 in FIG. 7, process 800 in FIG. 8, and/or other processes for the techniques described herein. Controller/processor 1140 may also implement page message processor 420 in FIG. 4. A memory 1142 may store program codes and data for BTS 120. Queues 1146 may store page messages to be sent to the access terminals and may implement queues 410 and 412 in FIG. 4. A communication (Comm) unit 1144 may support communication with other network entities, e.g., access network 130. In general, BTS 120 may include any number of controllers, processors, memories, transmitters, receivers, communication units, etc.

At access network 130, a controller/processor 1150 may perform various functions to support communication services, paging, etc. Controller/processor 1150 may perform or direct process 900 in FIG. 9 and/or other processes for the techniques described herein. Controller/processor 1150 may also implement page message generator 310 in FIG. 4. A memory 1152 may store program codes and data for access network 130 and may implement memory 320 in FIG. 3. A communication unit 1154 may support communication with other network entities, e.g., BTS 120, PDSN 140, etc. In general, access network 130 may include any number of controllers, processors, memories, communication units, etc.

The system may send page messages in subnets. A subnet may also be referred to as a paging area, a paging zone, etc. Access network 130 may forward page messages for access terminals within a given subnet to each BTS in that subnet. Each BTS may transmit page messages for all access terminals within its subnet. A larger subnet would include more access terminals and hence result in more page messages being generated for the subnet in each paging occasion. The number of page messages and the number of PHY packets may be reduced by (i) shrinking the subnets so that each subnet includes fewer access terminals or (ii) using distance based registration so that the page messages for each access terminal are forwarded to fewer BTSs. In either case, a page message intended for a given access terminal may be broadcasted from fewer BTSs. Sending page messages via fewer BTSs may reduce the number of PHY packets but may also result in the access terminals making more access attempts, which may then impact both battery life of the access terminals and reverse link capacity. The techniques described herein may be used with normal size subnets as well as smaller subnets in order to reduce the number of PHY packets to send for page messages in both cases.

The techniques described herein were tested in a deployed wireless system where a majority of page messages are delay insensitive. Table 1 lists the number of PHY packets sent in each paging occasion with and without QoS. For paging without QoS (column 2), one PHY packet is sent 36% of the time, two PHY packets are sent 62% of the time, and three PHY packets are sent 2% of the time. For paging with QoS (column 3), one PHY packet is sent 78% of the time, two PHY packets are sent 22% of the time, and three PHY packets are sent 0.1% of the time. The techniques described herein thus noticeably reduce the number of PHY packets to send on average.

TABLE 1

|   | Paging without QoS | Paging with QoS |
|---|---|---|
| 1 PHY packet | 36% | 78% |
| 2 PHY packets | 62% | 22% |
| 3 PHY packets | 2% | 0.1% |

The techniques described herein may provide certain advantages. First, the number of PHY packets to send for page messages may be reduced, as illustrated by the example above. This may in turn reduce the awake time and improve the standby time of access terminals. Second, the techniques may be readily implemented by the access network and BTSs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. A method of sending page messages in a wireless communication system, comprising:
   receiving, by a base transceiver station (BTS), page messages comprising quality-of-service (QoS) information; and
   sending, by the BTS, the page messages to access terminals based on the QoS information in the page messages, wherein sending the page messages comprises:
      generating and sending at least one paging packet with at least one page message that is delay sensitive, wherein the sending of the at least one paging packet is in a first paging occasion;
      generating an additional paging packet with at least one page message that is delay insensitive and excluding any page messages that are delay sensitive;
      adding a plurality of page messages that are delay insensitive to the additional paging packet; and
      sending, in a second paging occasion occurring after the first paging occasion, the additional paging packet that comprises the at least one page message that is delay insensitive when a portion of the additional paging packet filled with the plurality of delay-insensitive page messages is greater than or equal to a threshold, wherein the first and second paging occasions correspond to time intervals during which at least one access terminal is awake to receive paging packets and wherein the threshold corresponds to a particular percentage of the additional paging packet to be filled.

2. The method of claim 1, wherein sending the page messages further comprises:
  determining whether each of the page messages is delay sensitive or delay insensitive based on the QoS information in the page message.

3. The method of claim 2, wherein the QoS information for each page message comprises a bit indicating whether the page message is delay sensitive or delay insensitive.

4. The method of claim 2, further comprising:
  storing the page messages that are delay sensitive in a first queue; and
  storing the page messages that are delay insensitive in a second queue.

5. The method of claim 1, wherein the QoS information for each page message comprises at least one bit indicating delay requirements of the page message.

6. The method of claim 1, wherein the QoS information for each page message indicates one of a plurality of QoS levels, and wherein each page message is sent in an order determined based on the QoS level of the page message.

7. The method of claim 6, further comprising:
  increasing the QoS level of a particular page message when a particular delay associated with the particular page message exceeds a second threshold.

8. The method of claim 1, wherein sending the page messages further comprises:
  ordering the page messages that are delay insensitive based on a reception time of the page messages that are delay insensitive to produce ordered page messages; and
  filling the additional paging packet with the ordered page messages.

9. The method of claim 1, wherein the particular percentage is based on an estimate of loads on a control channel carrying the page messages to the access terminals.

10. The method of claim 1, wherein sending the page messages comprises sending the page messages without the QoS information to the access terminals.

11. The method of claim 1, wherein sending the page messages comprises sending the page messages with at least part of the QoS information to the access terminals.

12. The method of claim 1, wherein the sending of the page messages further comprises:
  sending another paging packet with another page message that is delay sensitive in the second paging occasion.

13. The method of claim 1, wherein the sending the page messages further comprises:
  refraining from sending the page messages during time intervals that do not correspond to paging occasions.

14. An apparatus for wireless communication, comprising:
  a memory; and
  at least one processor coupled to the memory and configured to:
    receive page messages comprising quality-of-service (QoS) information,
    send the page messages to access terminals based on the QoS information in the page messages,
    generate and send at least one paging packet with at least one page message that is delay sensitive, wherein the at least one paging packet is sent in a first paging occasion,
    generate an additional paging packet with at least one page message that is delay insensitive and without any page messages that are delay sensitive,
    add a plurality of page messages that are delay insensitive to the additional paging packet; and
    send, in a second paging occasion occurring after the first paging occasion, the additional paging packet that comprises the at least one page message that is delay insensitive when a portion of the additional paging packet filled with the plurality of delay-insensitive page messages is greater than or equal to a threshold, wherein the first and second paging occasions correspond to time intervals during which at least one access terminal is awake to receive paging packets and wherein the threshold corresponds to a particular percentage of the additional paging packet to be filled.

15. The apparatus of claim 14, wherein the at least one processor is further configured to determine whether each of the page messages is delay sensitive or delay insensitive based on the QoS information in the page message.

16. The apparatus of claim 14, wherein the at least one processor is further configured to send the page messages with at least part of the QoS information to the access terminals.

17. An apparatus for sending page messages in a wireless communication system, comprising:
  means for receiving page messages comprising quality-of-service (QoS) information; and
  means for sending the page messages to access terminals based on the QoS information in the page messages, wherein the means for sending the page messages is configured to:
    generate and send at least one paging packet with at least one page message that is delay sensitive, wherein the at least one paging packet is sent in a first paging occasion;
    generate an additional paging packet with at least one page message that is delay insensitive and without any page messages that are delay sensitive;
    adding a plurality of page messages that are delay insensitive to the additional paging packet; and
    send, in a second paging occasion occurring after the first paging occasion, the additional paging packet that comprises the at least one page message that is delay insensitive to when a portion of the additional paging packet filled with the plurality of delay-insensitive page messages is greater than or equal to a threshold, wherein the first and second paging occasions correspond to time intervals during which at least one access terminal is awake to receive paging packets and wherein the threshold corresponds to a particular percentage of the additional paging packet to be filled.

18. The apparatus of claim 17, wherein the means for sending the page messages is configured to:
  determine whether each of the page messages is delay sensitive or delay insensitive based on the QoS information in the page message.

19. The apparatus of claim 17, wherein the means for sending the page messages is configured to send the page messages with at least part of the QoS information to the access terminals.

20. A non-transitory computer-readable medium storing computer executable code for wireless communication, comprising code to:
- receive page messages comprising quality-of-service (QoS) information; and
- send the page messages to access terminals based on the QoS information in the page messages, wherein the code to send the page messages includes code to:
  - generate and send at least one paging packet with at least one page message that is delay sensitive, wherein the sending of the at least one paging packet is in a first paging occasion;
  - generate an additional paging packet with at least one page message that is delay insensitive and without any page messages that are delay sensitive;
  - add a plurality of page messages that are delay insensitive to the additional paging packet; and
  - sending, in a second paging occasion occurring after the first paging occasion, the additional paging packet that comprises the at least one page message that is delay insensitive when a portion of the additional paging packet filled with the plurality of delay-insensitive page messages is greater than or equal to a threshold, wherein the first and second paging occasions correspond to time intervals during which at least one access terminal is awake to receive paging packets and wherein the threshold corresponds to a particular percentage of the additional paging packet to be filled.

21. The non-transitory computer-readable medium of claim 20, further comprising code to:
- determine whether each of the page messages is delay sensitive or delay insensitive based on the QoS information in the page message.

* * * * *